March 31, 1942.  P. E. KÖSTER  2,278,379
CONTROL MEANS FOR GYROSCOPES
Filed June 1, 1939  2 Sheets-Sheet 1
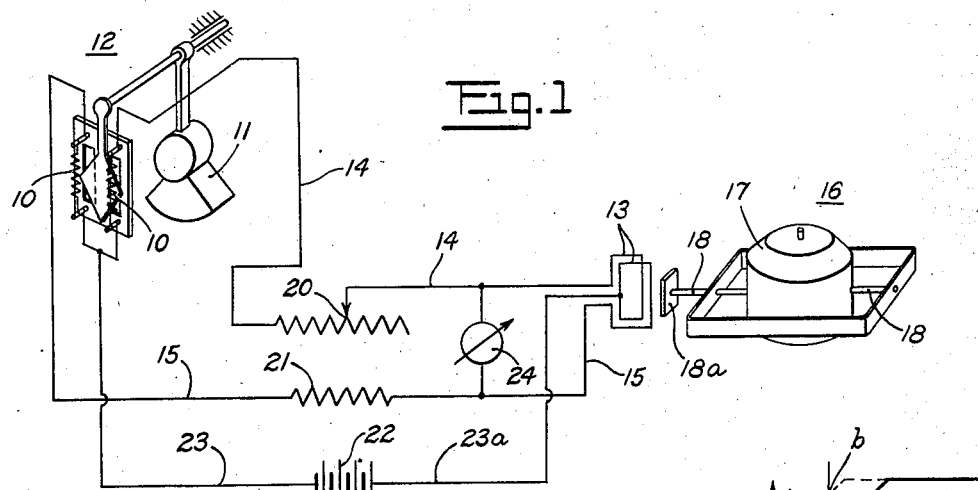
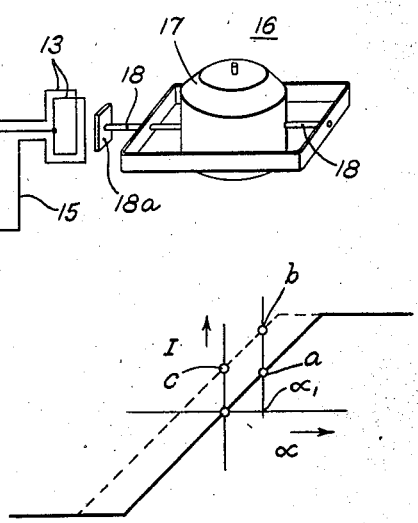
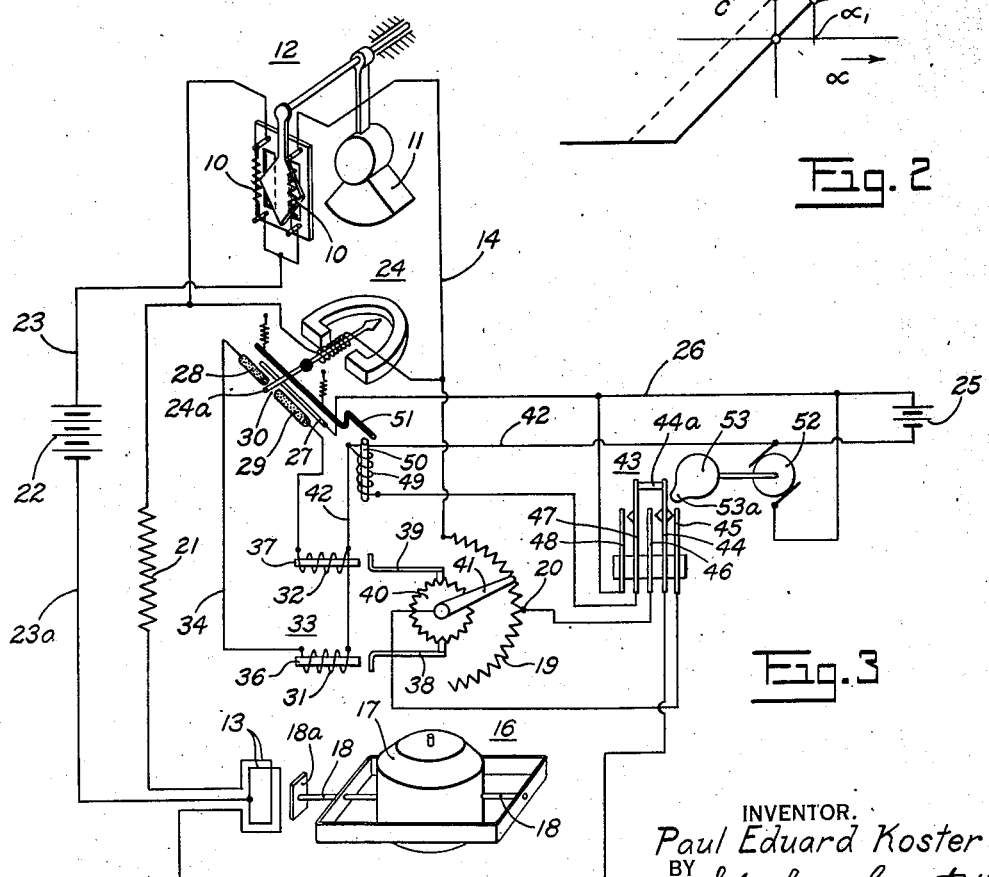
INVENTOR.
Paul Eduard Koster
BY Stephen Cerstvik
ATTORNEY.

March 31, 1942.    P. E. KÖSTER    2,278,379
CONTROL MEANS FOR GYROSCOPES
Filed June 1, 1939    2 Sheets-Sheet 2
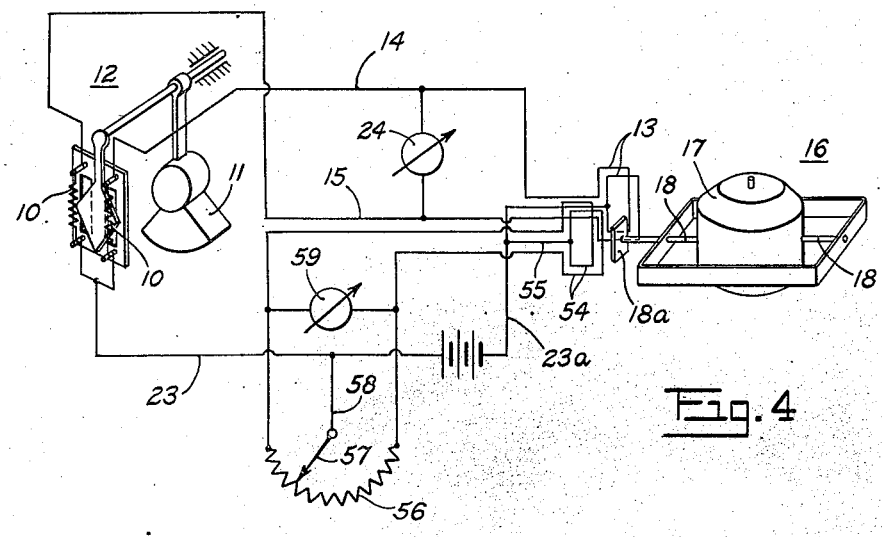
Fig. 4
Fig. 5
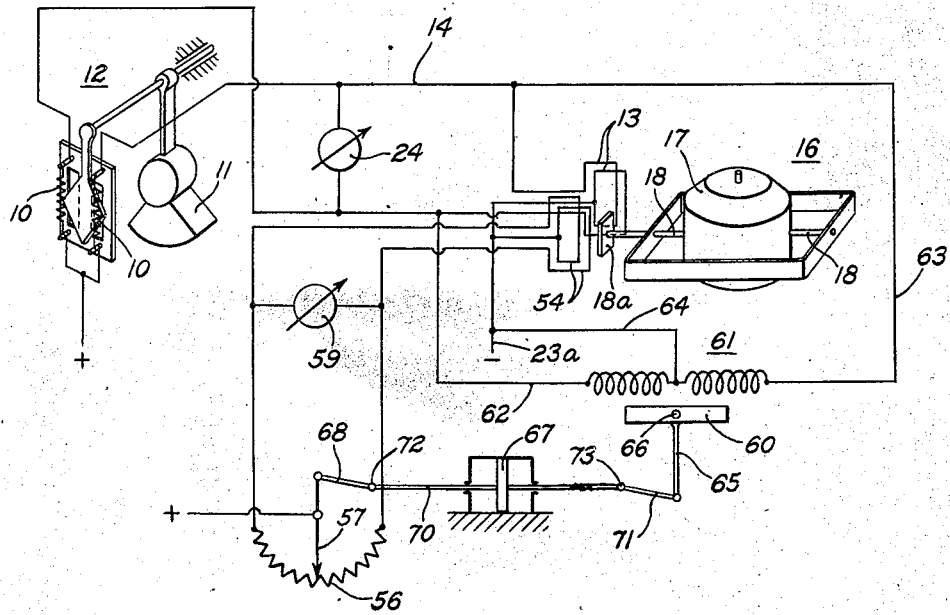
INVENTOR.
Paul Eduard Koster
BY Stephen Gerstvik
ATTORNEY.

Patented Mar. 31, 1942

2,278,379

UNITED STATES PATENT OFFICE 2,278,379

CONTROL MEANS FOR GYROSCOPES

Paul Eduard Köster, Berlin-Siemensstadt, Germany, assignor to Siemens Apparate und Maschinen Gesellschaft mit beschränkter Haftung, Berlin, Germany, a corporation of Germany Application June 1, 1939, Serial No. 276,934
In Germany April 8, 1937

5 Claims. (Cl. 74—5)

This invention relates to control means for gyros and more particularly to apparatus for restoring a free gyro to a predetermined normal position.

One of the objects of the present invention is to provide novel means for preventing the occurence of a premature equilibrium between the forces tending to restore a gyro to a normal position and the forces opposing such a restoration.

Another object of the invention is to provide a novel apparatus of the above character which is capable of restoring a gyro to a normal position in a minimum length of time.

An additional object is to provide a novel apparatus of the above character which will automatically return a gyro to a normal position.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Fig. 1 is a schematic diagram of one embodiment of the invention;

Fig. 2 is a graphical representation of changes in current characteristics of the present device;

Fig. 3 is a schematic diagram of a second embodiment of the invention;

Fig. 4 is a schematic diagram of a third embodiment of the invention; and

Fig. 5 is a shematic diagram of a fourth embodiment of the invention.

The invention illustrated in the accompanying drawings, by way of example, comprises apparatus for accurately moving free gyros, for example directional gyros, to a normal position whereby the free axis of the gyro is controlled by a governing device with the cooperation of an electric transmission unit. The governing device, for example, may be a pendulum, a compass, a speedometer, an altimeter, etc. Transmission units have been heretofore proposed which are provided, for example, with a control coil in operative connection with a gyro, the coil being in bridge connection with a second coil operatively connected to the governing device. Every deviation or precession of the gyro from its normal position causes a displacement of the bridge equilibrium for the reason that the craft will be flown in accordance with the erroneous gyro indication as fully illustrated and described in applicant's Patent 2,175,631 issued October 10, 1939, and a differential current passing through the bridge with the aid of the control coil produces a moment which is opposite to the motion of the gyro. However, in connection with this apparatus, a difficulty which continuously occurs consists in the failure of the gyro to accurately return to its normal position. Instead of such a complete return, there results an equilibrium between the torque or energy of the precessional movement of the gyro and the torque of the control device, such equilibrium occurring at a point outside of the normal position. It has been determined that the accuracy of the return motion depends upon the torque or energy of precession and upon the current characteristic of the control means, i. e., the rate of change of differential bridge current when the gyro moves away from the correct position. For example, if such a curve has a low slope and the gyro has a high precessional torque, it is found that an equilibrium of the control device is obtainable only after a relatively large "error angle" has occurred. If a galvanometer or zero pointer is employed in the bridge connection, it will clearly indicate the incorrect position of the gyro by failing to return to a zero indication when an equilibrium has been reached..

The present invention purposes to avoid the above drawback and to provide means for easily restoring the gyro from an incorrect to a correct position of equilibrium and to reduce the error angle, or angle between the true and the false positions of equilibrium, to zero. This is accomplished by adjusting, for example, the current characteristic of the bridge circuit and therefore of the control coil in such a manner that the current which ordinarily flows when the gyro is removed from the normal position now flows at said normal position. For this purpose, there is provided, for example, in the bridge circuit a variable resistance with which said current characteristic may be adjusted.

In the form shown in Fig. 1, the novel combination comprises a pair of heating coils 10 which are controlled by a governing device such, for example, as a pendulum 11, and which forms part of a bolometer arrangement 12, the temperature and hence the resistance of said coils being controlled by the bolometer. The bolometer may be of the conventional type such as disclosed in the issued patent to Eduard Fischel 2,137,194. In bridge connection with coils 10 are coils 13 by means of leads 14 and 15. Coils 13 are operatively connected with a gyro 16 having a housing 17 and gimbal trunnions 18 by means of a permanent magnet 18a which is rigidly secured to one of the trunnions 18 and normally disposed adjacent the coils 13.

In order that the current characteristic of the device may be adjusted to cause the gyro to regain equilibrium in a correct position, a variable resistance 19 having a center point 20 is provided in lead 14. A fixed resistance 21 is provided in lead 15 which is equal to the resistance 19 when the latter is adjusted to its mid-position.

A suitable source of electrical energy, for example a battery 22, is connected in a conventional manner to the coils 10 and 13 by means of leads 23 and 23a, and a zero-reader or galvanometer 24 is connected across the bridge also in a conventional manner.

In operation of the embodiment shown, if the pendulum 11 hangs down perpendicularly, then an air current flowing from the bolometer nozzle (not shown) is symmetrically obstructed with reference to the coils 10 and consequently air currents of equal flow impinge upon both of said coils. As a result, two electric currents flow in the bridge which are equal in magnitude but opposite in direction, and which balance one another. No moment is exerted upon the gyro 16. If, however, the pendulum 11 becomes deflected relative to the heating coils 10 due to a creeping of the gyro spin axis and a guiding of the craft in accordance with the erroneous indication, then one of the coils 10 will be subjected to a stronger air current than the other, thereby cooling the coil, decreasing its resistance, and unbalancing the bridge. Consequently a greater current now will flow in this coil than in the other, and a torque will be exerted upon the permanent magnet 18a, thus causing the gyro to precess about an axis which is perpendicular with respect to the axis of the inner gimbal trunnions.

The optimum condition of the apparatus is obtained when the galvanometer 24 comes to rest at zero with the resistance 19 adjusted to the mid-position. Under these conditions, no differential or return current is flowing in the bridge, and the gyro is at a normal desired position. However, if, due to the above-mentioned forces, equilibrium occurs when the gyro spin axis is not in the normally true vertical position, for example when an error angle $\alpha$ 1 exists (Fig. 2), there will also exist a differential current $a$ for the reason that the craft will be flown in accordance with the erroneous gyro indication. Assuming that the characteristic is linear, a sufficiently strong current may be caused to flow to urge the gyro into a correct normal position by adjusting the resistance 19 until, for example, a current $b$ flows and the deflection of the galvanometer is double the prior value. In this condition, the bridge equilibrium is disturbed and the gyro tends to return to the desired position. In order to check the accuracy of the return movement, it is necessary to momentarily return the resistance 19 to the mid-position. If the error-angle is zero, that is, if the gyro spin axis is parallel with the pendulum and the true vertical no differential current will be flowing in the bridge and the deflection of the zero pointer will be zero. If the return to zero does not take place, then additional adjustment in the above manner will be necessary.

The form of the invention shown in Fig. 3 is similar to that of Fig. 1 with the exception that in the former means are provided for automatically adjusting the variable resistance 19. The associated gyroscope 16 and bolometer 12 with its heater coils 10 are shown in the same manner as illustrated in Figure 1.

The means for making the automatic adjustment comprise, in the embodiment illustrated, a power source, for example an electric battery 25 which is connected by a lead 26 to a contact plate 27. An extension 24a of the pointer of galvanometer 24 is situated adjacent and preferably above plate 27, the pointer being so mounted that a downward pressure upon the extension 24a will bring it into contact with plate 27. The extension 24a, depending upon its angular position, may extend above either a second contact plate 28 or a third plate 29, the latter two being separated for a purpose to appear later by an insulator or air gap 30 over which the extension 24a is located when the pointer is in the zero position. Plates 28 and 29 are respectively connected to electro-magnets 31 and 32 of a step-by-step system 33 by leads 34 and 35. The solenoids 31 and 32, having cores 36 and 37 respectively, are arranged to actuate pawls 38 and 39 which are in engagement with a star-wheel 40 upon which is mounted an arm 41 movable upon the variable resistance 19. Electro-magnets 31 and 32 are connected by a common lead 42 to the power source 25.

In order that one of the above electro-magnets may be energized intermittently, thereby to adjust resistance 19, and also to provide means for momentarily tapping resistance 19 at the mid-point thereof, a switch 43 is provided which in the normal position, as shown, routes the bridge current through two separable contact posts 44, 45 to the arm 41. Three additional posts 46, 47 and 48 are also provided. Posts 44 and 47 are caused to move together by an interconnecting bar of insulating material 44a. Post 46 is connected to mid-point 20 of resistance 19, and is adjacent post 44 which, when moved to the left as viewed in Fig. 3, is adapted for electrically contacting post 46. Posts 48 and 47 are connected respectively to lead 26 and to a solenoid 49 having a core 50, which upon energization thereof, actuates an oscillator bar 51. The latter is located adjacent extension 24a and is adapted for thrusting the extension 24a into contact with plate 27 and simultaneously with either plate 28, 29 or with insulator or air gap 30. Extension 24a therefore acts as a switch arm which is positionable in response to the direction and amount of current flowing in the instrument 24.

An electric motor 52 connected across leads 26 and 42 is operatively connected to a cam 53 having a finger 53a which, upon movement of the cam, is able to contact post 44 and to move the same, together with post 47, into contact with posts 46 and 48 respectively.

In operation, motor 52 rotates cam 53 thereby intermittently switching the flow of bridge current from a path through arm 41 to a path through mid-point 20. The energizing of electro-magnets 49 occurs immediately after the above switching action.

If a condition of equilibrium exists as above explained, wherein a gyro is at a correct or normal position, then the pointer of galvanometer 24 will be centrally disposed, extension 24a will intermittently contact plate 27 and insulator 30. The electro-magnets 31, 32 will therefore not be energized and arm 41 will remain unchanged in position. However, if a condition of equilibrium occurs wherein the gyro comes to rest at a point which is removed from the normal position, the extension 24a will no longer be centrally disposed but will move for example over the plates 27, 28 and will there come to rest. Additional current in the bridge is needed to overcome this condition and to shift the gyro into a normal position. Cam 53 first closes contact between posts 44, 46, thereby tapping resistance 19 at mid-point 20 and causing the pointer to give a true indication of the error magnitude. Thereafter posts 47, 48 close contact, electro-magnet 49 is energized and bar 51 thrusts extension 24a into contact with plates 27 and 28. The electro-magnet 31 is then energized thereby shifting arm 41 by means of pawl 38 and star-wheel 40. The shift in the arm 41 changes the resistance 19, causing a different differential current to flow to aid in moving the gyro to a normal position. As cam 53 continues to rotate, the finger 53a moves out of contact with the switch 43 which assumes the position shown. If the above shift in arm 41 is not effective to move the gyro to the desired position, the shift will be repeated each time cam 53 actuates switch 43 until finally the extension 24a will be disposed over insulator 30, simultaneously with the tapping of resistance 19 at 20. When this occurs, the gyro will be in the normal position as desired.

Another embodiment of the present invention is shown in Fig. 4 wherein means are provided for continuously indicating the magnitude of the error in the position of equilibrium of the apparatus. This is accomplished by providing a bridge connection which is identical to that shown in Fig. 1 with the exception that resistances 19 and 21 are omitted. The galvanometer 24 will therefore indicate at all times whether or not the gyro 16 is in a normal position. In combination with the circuit there is employed a second circuit having a pair of control coils 54 which are operatively related to the gyro as are coils 13. Coils 54 are connected to lead 23a by a lead 55 which is attached to adjacent extremities of each of said coils. The latter are in bridge connection with a variable resistance 56 having a movable arm 57 which by a lead 58 is connected to lead 23. A galvanometer 59 is inserted in this bridge circuit in a manner analogous to that of galvanometer 24.

In the operation of this embodiment, if an error exists in the equilibrium position of the gyro, it will be indicated continuously upon galvanometer 24. In order to urge the gyro into the normal position, a differential current may be caused to flow in control coils 54. The indication of instrument 59 will provide a measure of the correction applied and as above mentioned the galvanometer 24 will indicate whether or not the gyro has returned to a normal position. The resistance 56 is therefore adjusted until the indication at the galvanometer 24 is zero.

Means for automatically adjusting the arm 57 of variable resistance 56 in accordance with the differential current flowing in the first described bridge circuit are shown in Fig. 5. The means comprise, in the form shown, a rotary magnet 60 which is governed by a coil 61. The latter is connected at the extremities thereof by leads 62 and 63 with leads 14 and 15 respectively. The mid-point of the coil is connected to lead 23a by a lead 64. Magnet 60 is operatively connected to resistance arm 57, for example, by a lever 65 pivoted at 66, which positions a plunger 67 of a dash-pot 67a and an arm 68 pivotally connected to arm 57. Arms 68 and 71 are pivotally mounted at 72 and 73 to transfer arcuate movement to rod 70 carrying the plunger 67.

In the operation of this embodiment, if the gyro comes to rest at a point removed from the normal position, a differential current will flow in the upper bridge circuit, i. e., in leads 14 and 15, which will actuate the rotary magnet 60 in accordance therewith thereby moving arm 57 of variable resistance 56 a sufficient amount to cause a differential current to flow in the additional control coil 54. The effect of the differential current in the additional control coils will restore the gyro to the normal position, thereby reducing the differential current in the upper bridge circuit to zero.

There is thus provided a novel apparatus for maintaining a gyroscope in a predetermined normal position and for overcoming a condition of equilibrium which occurs at a point removed from the correct position, the equilibrium occurring between forces external to and inherent in the gyro. The device is simple in construction and accurate in operation.

Although only four embodiments of the invention have been illustrated and described, it is to be expressly understood that the invention is not limited thereto. Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. In apparatus of the class described, a bridge circuit having a control coil and a heater coil, a governing device for varying the temperature of said heater coil, a source of current for said bridge circuit, a gyro having a portion thereof magnetically linked with said control coil whereby during a normal position of said gyro the bridge is balanced, said governing device being operative upon deviation thereof from its normal position to vary the temperature and resistance of said heater coil to unbalance the bridge circuit, thereby energizing the control coil to impose a correcting torque on the gyro, said bridge having differential current flow therein when said gyro assumes equilibrium at a position other than its normal position, a variable resistance in said bridge circuit between said coils, a fixed resistance in said bridge circuit in parallel with the variable resistance but connected to extremities of said coils which are opposite to those to which the variable resistance is connected, the variable resistance being equal to the fixed resistance when the former is adjusted to a mid-position, and means for adjusting the value of said variable resistance a predetermined amount when said gyro reaches equilibrium at a point remote from its normal position whereby current is caused to flow additively with the differential current flowing in said bridge to thereby additively energize said control coil to restore said gyro to its normal position.

2. In apparatus of the class described, an electrical bridge circuit having a control coil group and a heater coil group, a governing device for varying the temperature of said heater coil group, a source of current for said bridge circuit, a gyro having a portion thereof magnetically linked with said control coil group whereby during a normal position of said gyro the bridge is balanced, said governing device being operative upon deviation thereof from its normal position to vary the temperature and resistance of said heater coil group to unbalance the bridge circuit thereby energizing the control coil group to impose a correcting torque on the gyro, said bridge having differential current flow therein when said gyro assumes equilibrium at a position other than its normal position, a zero pointer connected across said bridge circuit and deflected during current flow in said circuit, a fixed resistance in said circuit, a variable resistance in said circuit equal in value to the fixed resistance at a predetermined point thereon, adjusting means for determining the amount of said variable resistance in said circuit, a switch positionable in response to the current indicated by said zero pointer when said gyro reaches equilibrium at a point remote from its normal position for controlling a current to said adjusting means for operating the same whereby the value of said variable resistance is changed causing current to flow additively with the current flowing in said bridge, thereby additionally energizing said control coil group to restore said gyro to its normal position, closing means for said switch, a second switch adapted for first tapping said variable resistance at said predetermined point and thereafter for actuating said closing means, and means for intermittently actuating said second switch.

3. In apparatus of the class described, an electrical bridge circuit comprising a source of electrical energy and a pair of heater coils and a pair of control coils, a governing device controlling the temperature of said heater coils, a free gyro mounted for three degrees of freedom with its spin axis in a predetermined normal position and magnetically linked with said control coils whereby during a normal position of said gyro spin axis said bridge is balanced, said governing device being operative upon deviation thereof from its normal position to vary the temperature and resistance of said heater coils to unbalance the bridge circuit, thereby energizing the control coils to impose a correcting torque on said gyro for restoring its spin axis to said normal position, said bridge having differential current flow therein when said gyro spin axis assumes equilibrium at a position other than said normal position, a zero pointer connected across said bridge circuit and deflected during current flow in said circuit, a fixed resistance in said circuit, a variable resistance in said circuit equal in value to the fixed resistance at a predetermined point thereon, adjusting means for determining the amount of said variable resistance in said circuit, a switch positionable in response to the current indicated by said zero pointer when said gyro spin axis assumes equilibrium at a position other than said normal position for controlling a current to said adjusting means whereby the value of said variable resistance is changed causing current to flow additively with the differential current flowing in said bridge, thereby additively energizing said control coils to restore said gyro spin axis to said normal position, periodically energized means for closing said switch, and a cam actuated switch for first tapping said variable resistance at said predetermined point and thereafter energizing said closing means.

4. In apparatus of the class described, a universally mounted free gyro having its spin axis in a predetermined normal position, a bridge circuit having a heater coil and a control coil, a source of current for said bridge circuit, a portion of said gyro being magnetically linked with said control coil, a governing device adjacent said heater coil being operative upon deviation thereof from its normal position to vary the temperature and resistance of said heater coil to unbalance the bridge circuit, thereby energizing the control coil to impose a correcting torque on said gyro, said bridge circuit having differential current flow therein when said gyro spin axis assumes a position of equilibrium other than said normal position, and electrical means comprising a second bridge circuit having a second control coil magnetically linked with a portion of said gyro and a variable resistance whose effective value is determined in accordance with the differential current flowing in said first bridge circuit when said gyro spin axis assumes a position of equilibrium other than said normal position to cause current flow in said second coil to thereby restore said gyro spin axis to said normal position.

5. In an apparatus of the class described, a universally mounted free gyro having its spin axis in a predetermined normal position, a bridge circuit having a heater coil and a control coil, a source of current for said bridge circuit, a portion of said gyro being magnetically linked with said control coil, a governing device adjacent said heater coil being operative upon deviation thereof from its normal position to vary the temperature and resistance of said heater coil to unbalance the bridge circuit thereby energizing the control coil to impose a correcting torque on said gyro, said bridge having differential current flow therein when said gyro spin axis assumes a position of equilibrium other than said normal position, a second bridge circuit also having a control coil magnetically linked with a portion of said gyro and a variable resistance, a coil electrically connected with said first-named bridge circuit having current flow therein when said gyro spin axis assumes equilibrium at a point remote from said normal position, and control means actuated in accordance with the differential current flow in said last-named coil for adjusting the value of said variable resistance in said second bridge circuit to cause current flow in said second control coil to thereby restore the gyro spin axis to said normal position at which position the bridge circuits are balanced.

PAUL EDUARD KÖSTER.